(No Model.)
J. K. PILKINGTON.
SHAFT ATTACHMENT FOR VEHICLES.
No. 594,648. Patented Nov. 30, 1897.
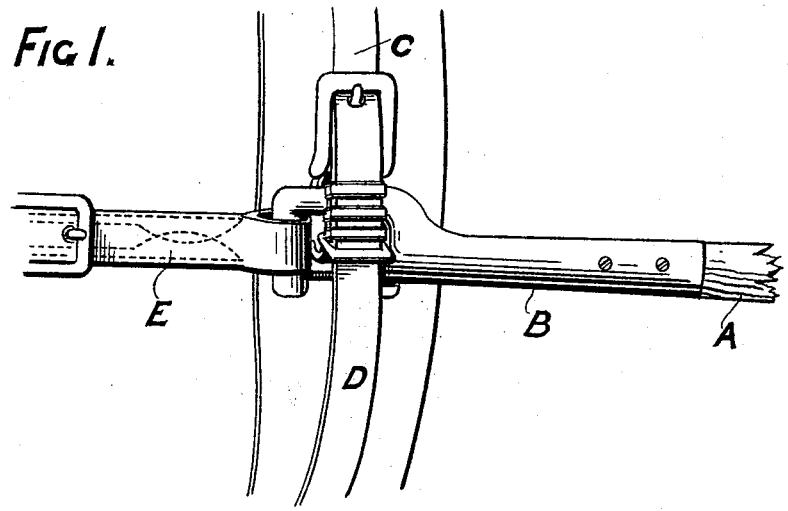
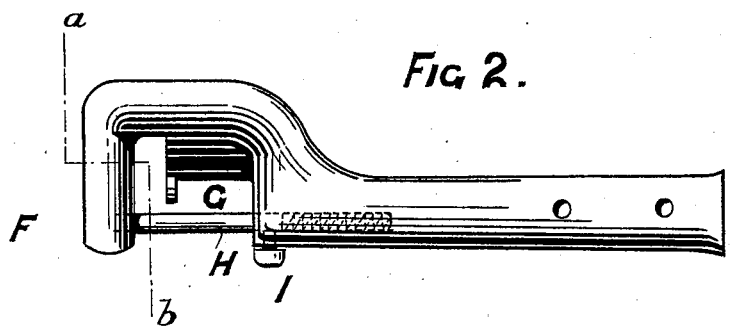
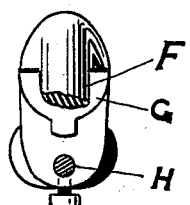
Witnesses
M. V. Bidgood
J. Green
Inventors
John Kirby Pilkington
By Hartley Knight
Atty

UNITED STATES PATENT OFFICE.

JOHN K. PILKINGTON, OF LIVERPOOL, ENGLAND.

SHAFT ATTACHMENT FOR VEHICLES.

SPECIFICATION forming part of Letters Patent No. 594,648, dated November 30, 1897.

Application filed January 12, 1897. Serial No. 618,949. (No model.)

*To all whom it may concern:*

Be it known that I, JOHN KIRBY PILKINGTON, veterinary surgeon, of 47 and 49 Fox Street, Liverpool, in the county of Lancaster, in the Kingdom of England, have invented certain new and useful Improvements in or Relating to the Shafts of Vehicles, of which the following is a specification.

This invention relates to certain improvements in the shafts of vehicles, and is designed to provide a shaft which will be stronger and less liable to break if the horse slips or falls, and to which, moreover, the harness can be more easily and more quickly connected.

The invention will be understood from the following description, reference being had to the accompanying drawings, in which—

Figure 1 is a side elevation of a shaft end in use, showing the invention applied thereto; Fig. 2, a detail view, on a larger scale, of the shaft end; and Fig. 3, a sectional end elevation taken on the line $a\ b$.

In the drawings, A is a vehicle-shaft, made without the usual pointed end which is so liable to break when the horse falls, and B a metal end to the shaft, having a hook or claw. This hook or claw is made in such manner that the loop usually interposed between the back-band C and belly-band D and also the loop at the end of the trace can be coupled thereto at right angles to each other. For this purpose the claw or hook is made in a special manner with a given portion F, arranged to receive the loop of the trace E, and a given portion G, arranged to receive the loop interposed between C and D, and thus when the bands C and D and the trace E are in position they will be at right angles to one another and occupy given positions. The only alteration required in the ordinary harness is the substitution of the short trace E for the long trace usually hitherto used. The said shaft end B may be a casting, forging, or stamping, and it is provided with a spring-bolt H, with handle I, which normally closes the parts F and G.

To harness or unharness a horse, all that is necessary is to slide back the spring-bolt H and pass the hook or claw through the loops of the harness, after which the spring-bolt is allowed to spring forward, closing the opening. One advantage of this arrangement is that it avoids having to unbuckle the harness when the horse is down, and so prevents people getting into danger. So long as the spring-bolt lies across the opening the fastening is made and the loops are kept in place so that they cannot slip, no matter what amount of vibration there may be.

In use I pass the shaft ends through the loops of the back and belly bands first, and then when these loops occupy their appointed position loop the traces in place. The loops on the saddle-bands are the ordinary loops through which the shafts are usually passed, and these loops are slipped over the hook in case said loop is large enough to pass over the vertical end of the hook by simply pushing the hook through the loop. In some cases, however, the loop is not large enough to go easily over the hook, and it is then necessary to bend the loop into a horizontal position, slip it up over the vertical end of the hook and past the corner onto the horizontal part of the hook. The loop is always sufficiently large and flexible to pass over the corner without difficulty.

Among the advantages obtained by the use of this invention may be mentioned that the pointed ends of shafts are dispensed with, thus avoiding any possibility of the horse injuring himself thereby. A long trace is dispensed with, and so any rubbing or chafing of the horse's body, harness, and shafts is avoided, and there is no chance of the horse getting its legs over the trace when kicking. It dispenses with buckling and complication in harness. A horse can be instantly harnessed or unharnessed by sliding back the spring-bolt H. A horse when being broken in or for general use can be turned with greater ease and at a sharper angle, and finally knee-motion is prevented, thus making a two-wheeled vehicle to run almost as steady as a four-wheeled one.

I declare that what I claim is—

1. The combination of a vehicle-shaft extending forward only as far as the saddle-band, a metal end thereon having a rigid hook with a portion at right angles to the shaft, for receiving the loop of the trace, and a portion parallel to the shaft for receiving the loop of the saddle-band, a looped short trace, and a looped saddle-band.

2. The combination with a looped saddle-band and a looped short trace, extending back only as far as the saddle-band, of a vehicle-shaft extending forward only as far as the saddle-band, and a metal end thereon having a rigid claw with a portion at right angles to the shaft, for receiving the loop of the trace, a portion parallel to the shaft for receiving the loop of the saddle-band, and a spring-pin supported in the metal end and engaging with the claw so as to hold both the trace and saddle-band to the shaft.

3. The combination with a looped short trace and a looped saddle-band of a short shaft and a metal end thereon having a rigid bent hook with a portion at right angles to the shaft and a portion parallel to the shaft, receiving respectively the trace and saddle-band loop, and a spring-pin closing the opening of the hook.

In testimony whereof I have signed my name to this specification in the presence of two subscribing witnesses.

J. K. PILKINGTON.

Witnesses:
G. C. DYMOND,
W. H. BEESTON.